(12) United States Patent
Morgans et al.

(10) Patent No.: US 11,267,519 B1
(45) Date of Patent: Mar. 8, 2022

(54) PILLAR-BOX RAIL-CAB BACK STRUCTURAL JOINTS FOR UNIBODY VEHICLES

(71) Applicant: FORD GLOBAL TECHNOLOGIES, LLC, Dearborn, MI (US)

(72) Inventors: Shawn Michael Morgans, Chelsea, MI (US); Steve William Gallagher, Bloomfield Hills, MI (US); Vladimir Vladimirovich Bogachuk, West Bloomfield, MI (US); Marius Curea, Canton, MI (US); Musheeruddin Zubair Syed, Farmington Hills, MI (US); Scott Seashore, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 17/000,631

(22) Filed: Aug. 24, 2020

(51) Int. Cl.
*B62D 33/02* (2006.01)
*B62D 27/02* (2006.01)
*B62D 25/04* (2006.01)
*B62D 33/077* (2006.01)

(52) U.S. Cl.
CPC .............. *B62D 33/02* (2013.01); *B62D 25/04* (2013.01); *B62D 33/077* (2013.01); *B62D 33/0222* (2013.01)

(58) Field of Classification Search
CPC .... B62D 33/02; B62D 33/077; B62D 27/023; B62D 25/04
USPC .............................. 296/183.1, 193.06, 29, 30
See application file for complete search history.

(56) References Cited

U.S. PATENT DOCUMENTS

| 7,766,416 B2 | 8/2010 | McClure et al. |
| 8,960,776 B2 | 2/2015 | Boettcher et al. |
| 9,266,569 B1 | 2/2016 | Tew et al. |

OTHER PUBLICATIONS

Jalopnik, Mid-Size Trucks Don't Need Frames, David Tracy, Aug. 25, 2016 2:41 PM, 20 pages, https://jalopnik.com/mid-size-trucks-dont-need-frames-1785674405, from internet Mar. 25, 2020.

*Primary Examiner* — Dennis H Pedder
(74) *Attorney, Agent, or Firm* — Vichit Chea; Carlson, Gaskey & Olds, P.C.

(57) ABSTRACT

This disclosure details exemplary pillar-to-box rail-to-cab back structural joints for unibody vehicles. An exemplary structural joint of a unibody vehicle may include a pillar assembly and a box rail assembly that intersects the pillar assembly and extends continuously up to a door opening flange of the pillar assembly. The pillar assembly and box rail assembly may establish a beam-to-beam connection of the structural joint. A cab back assembly may be secured relative to the pillar assembly and the box rail assembly to establish a third portion of the structural joint. Various spot welds may be provided for joining the various components of the structural joint.

19 Claims, 6 Drawing Sheets

PILLAR-BOX RAIL-CAB BACK STRUCTURAL JOINTS FOR UNIBODY VEHICLES

TECHNICAL FIELD

This disclosure relates generally to pillar, box rail, and cab back structural joints for unibody vehicles.

BACKGROUND

A traditional body-on-frame pickup truck body has a separate passenger cab and pickup cargo box that are attached to a vehicle frame. A unibody pickup truck does not have a separate vehicle frame, and as a result, a pillar, a cab back of the passenger cabin, and a box rail of the pickup cargo box converge at a structural joint. The structural joint should be capable of providing various structural features and characteristics.

SUMMARY

A structural joint of a unibody vehicle according to an exemplary aspect of the present disclosure includes, among other things, a pillar assembly and a box rail assembly that intersects the pillar assembly and extends continuously up to a door opening flange of the pillar assembly.

In a further non-limiting embodiment of the foregoing structural joint, the unibody vehicle is a unibody pickup truck.

In a further non-limiting embodiment of either of the foregoing structural joints, the pillar assembly includes an inner pillar member and an outer pillar member.

In a further non-limiting embodiment of any of the foregoing structural joints, the box rail assembly includes an inner box rail member and an outer box rail member.

In a further non-limiting embodiment of any of the foregoing structural joints, a first spot weld joins together a first mating flange of the inner box rail member, a first door opening flange of the inner pillar member, a second mating flange of the outer box rail member, and a second door opening flange of the outer pillar member.

In a further non-limiting embodiment of any of the foregoing structural joints, a second spot weld joins together the inner box rail member and a rear loading flange of the inner pillar member.

In a further non-limiting embodiment of any of the foregoing structural joints, a third spot weld joins together the outer box rail member and a rear loading flange of the outer pillar member.

In a further non-limiting embodiment of any of the foregoing structural joints, the box rail assembly intersects the pillar assembly at about a right angle.

In a further non-limiting embodiment of any of the foregoing structural joints, at least one internal baffle is disposed inside the structural joint.

In a further non-limiting embodiment of any of the foregoing structural joints, the at least one internal baffle includes a first internal baffle inside the pillar assembly and a second internal baffle inside the box rail assembly.

In a further non-limiting embodiment of any of the foregoing structural joints, a cab back assembly is secured to a sub-assembly of the pillar assembly and the box rail assembly.

In a further non-limiting embodiment of any of the foregoing structural joints, the cab back assembly includes an inner cab back member, an outer cab back member, and a cab back panel secured between the inner cab back member and the outer cab back member.

A unibody vehicle according to another exemplary aspect of the present disclosure includes, among other things, a pillar assembly including an inner pillar member and an outer pillar member, a box rail assembly joined to the pillar assembly and including an inner box rail member and an outer box rail member, and a first spot weld joining a first mating flange of the inner box rail member, a first door opening flange of the inner pillar member, a second mating flange of the outer box rail member, and a second door opening flange of the outer pillar member.

In a further non-limiting embodiment of the foregoing unibody vehicle, the unibody vehicle is a pickup truck.

In a further non-limiting embodiment of either of the foregoing unibody vehicles, a second spot weld joins the inner box rail member to a rear loading flange of the inner pillar member.

In a further non-limiting embodiment of any of the foregoing unibody vehicles, a third spot weld joins the outer box rail member to a rear loading flange of the outer pillar member.

In a further non-limiting embodiment of any of the foregoing unibody vehicles, the pillar assembly and the box rail assembly establish a beam-to-beam connection of a structural joint of the unibody vehicle.

In a further non-limiting embodiment of any of the foregoing unibody vehicles, a first internal baffle is disposed between the inner pillar member and the outer pillar member, and a second internal baffle is disposed between the inner box rail member and the outer box rail member.

In a further non-limiting embodiment of any of the foregoing unibody vehicles, the inner box rail member extends an entire distance between a first rear loading flange and the first door opening flange of the inner pillar member, and the outer box rail member extends an entire distance between a second rear loading flange and the second door opening flange of the outer pillar member.

In a further non-limiting embodiment of any of the foregoing unibody vehicles, a cab back assembly is secured to a sub-assembly of the pillar assembly and the box rail assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary pillar-to-box rail-to-cab back structural joints for unibody vehicles. An exemplary structural joint of a unibody vehicle may include a pillar assembly and a box rail assembly that intersects the pillar assembly and extends continuously up to a door opening flange of the pillar assembly. The pillar assembly and box rail assembly may establish a beam-to-beam connection of the structural joint. A cab back assembly may be secured relative to the pillar assembly and the box rail assembly to establish a third portion of the structural joint. Various spot welds may be provided for joining the various components of the structural joint. These and other features of this disclosure are described in greater detail in the following paragraphs of this detailed description.

Figure 1:
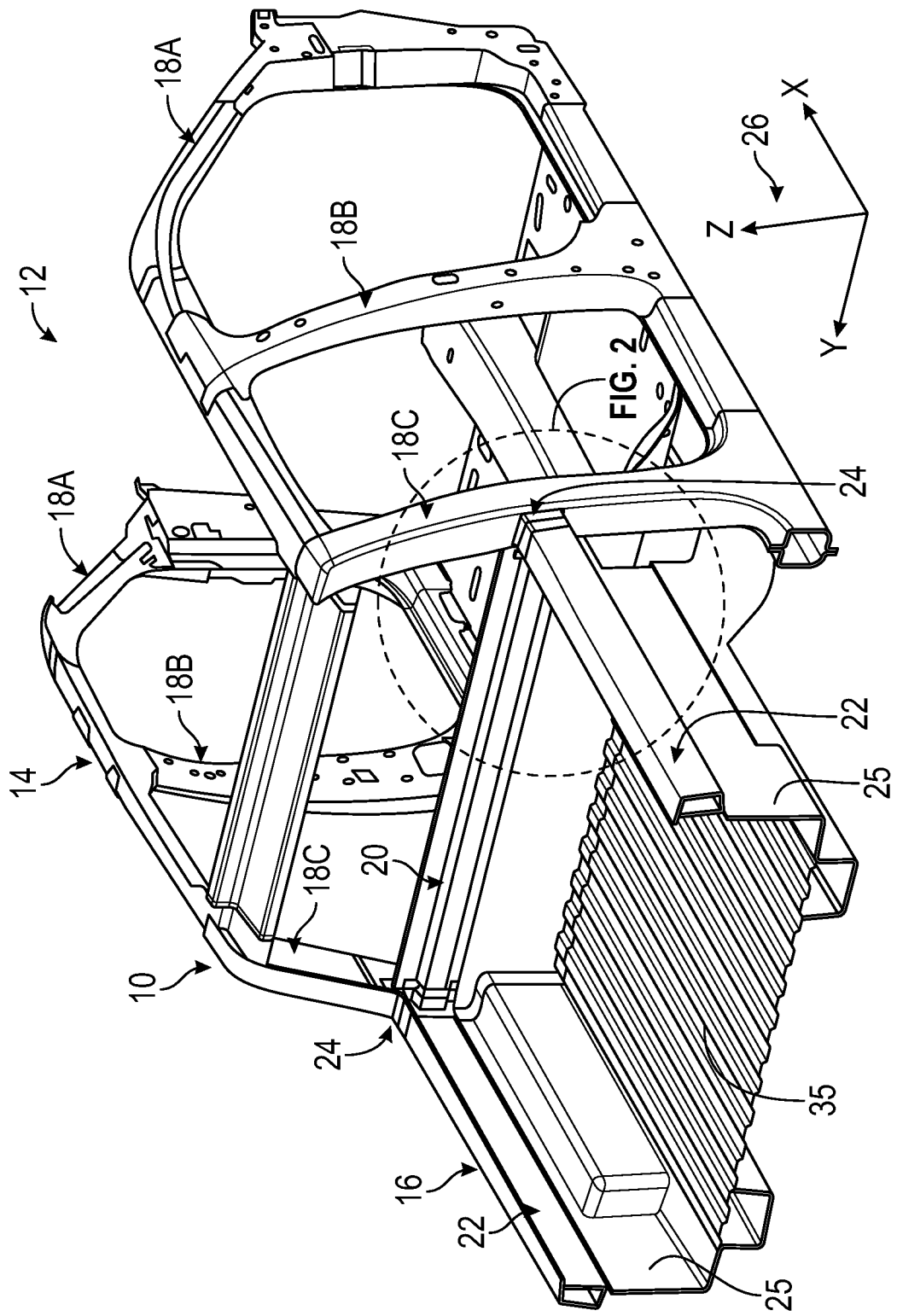
FIG. 1 illustrates select portions of a unibody of a vehicle. In an exemplary embodiment, the vehicle is configured as a pickup truck.
Figure 2:
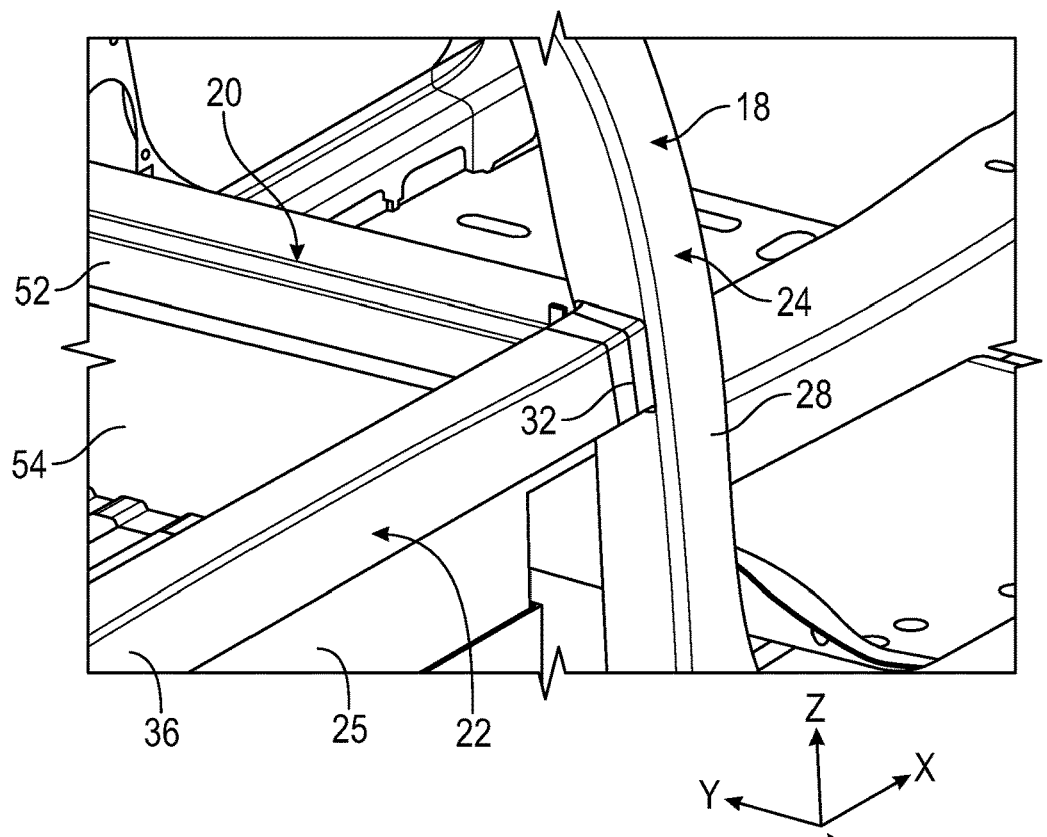
FIG. 2 is a blown-up view of a structural joint of the unibody of FIG. 1.
Figure 3:
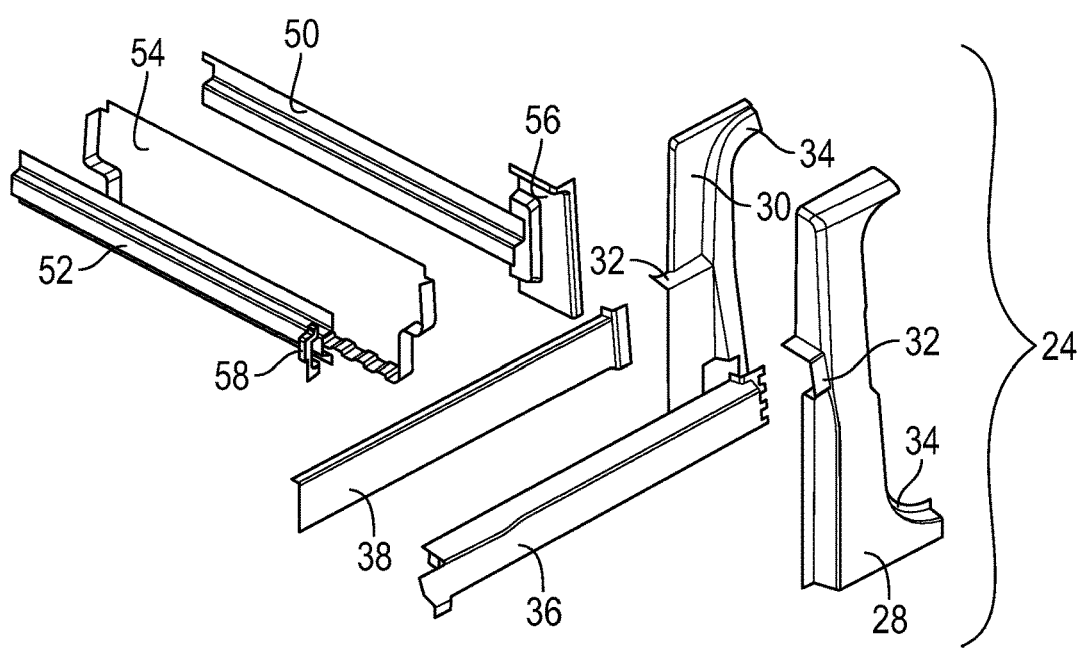
FIG. 3 is an exploded view of the structural joint of FIG. 2.

FIG. 1 schematically illustrates select portions of a unibody 10 of a vehicle 12, which in an exemplary embodiment is configured as a pickup truck. Although a specific component relationship is illustrated in the figures of this disclosure, the illustrations are not intended to limit this disclosure. The placement and orientation of the various components of the vehicle 12 are shown schematically and could vary within the scope of this disclosure. In addition, the various figures accompanying this disclosure are not necessarily to scale, and some features may be exaggerated or minimized to emphasize certain details of a particular component.

The vehicle 12 may include a passenger cabin 14 and a cargo box 16 disposed rearward of the passenger cabin 14. The passenger cabin 14 may define an interior for accommodating one or more vehicle passengers. The passenger cabin 14 may include two or more pillar assemblies 18 located on both a driver side and a passenger side of the vehicle 12. In an embodiment, the vehicle 12 is an extended cab pickup truck and therefore includes A-pillars 18A, which are closest the front of the vehicle 12, C-pillars 18C, which are closest to the cargo box 16 of the vehicle 12, and B-pillars 18B, which are intermediate pillars disposed between the A-pillars 18A and the C-pillars 18C. However, the teachings of this disclosure are also applicable to standard cab pickup trucks, which would only include the A-pillars 18A and the B-pillars 18B.

Unless stated otherwise in this disclosure, the use of a given reference numeral (e.g., 18, etc.) without any alphabetic identifier immediately following the reference numeral may refer to any of the components identified by that same reference number. For example, when used alone, the reference numeral "18" may refer to any of the pillar assemblies 18A, 18B, or 18C.

A cab back assembly 20 may separate the passenger cabin 14 from the cargo box 16. The cab back assembly 20 may therefore establish portions of both the passenger cabin 14 and the cargo box 16 within the unibody 10.

The cargo box 16 establishes a cargo space for storing and hauling cargo on the vehicle 12. The cargo box 16 may include a pair of opposing and longitudinally extending box rail assemblies 22 that establish upper rails of the cargo box 16. The box rail assemblies 22 may also be referred to as belt rail assemblies. One or more cargo box panels 25 (e.g., cargo box inner and outer panels) may be secured to each box rail assembly 22 for constructing the cargo box 16. A floor panel 35 may extend between the cargo box panels 25.

Because of the unibody 10 configuration of the vehicle 12, the passenger cabin 14 and the cargo box 16 are not supported on a separate vehicle frame. As such, in the illustrated embodiment, the pillar assembly 18C (or pillar assembly 18B for standard cab configurations), the cab back assembly 20, and the box rail assembly 22 converge at a structural joint 24 of the unibody 10. As discussed in greater detail below, the pillar assembly 18C and the box rail assembly 22 may establish a high strength and durable beam-to-beam interconnection of the structural joint 24.

The unibody 10 of the vehicle 12 of FIG. 1 is shown relative to a three dimensional Cartesian coordinate system 26 that generally orients the unibody 10 relative to X, Y, and Z axis directions. Axis line X generally represents an X-axis direction along a length of the unibody 10 of the vehicle 12, the axis line Y generally represents a Y-axis direction across a width of the unibody 10 of the vehicle 12, and the axis line Z generally represents a Z-axis direction along a height of the unibody 10 of the vehicle 12. Reference may be made periodically throughout this specification to the X-axis, the Y-axis, and the Z-axis directions. These directions coincide with the X, Y, and Z axes indicated by the Cartesian coordinate system 26 shown in FIG. 1.

The exemplary structural joint 24 of the unibody 10 of FIG. 1 is shown in greater detail with reference to FIGS. 2-7. Although only a passenger side structural joint 24 of the vehicle 12 is illustrated, a substantially similar structural joint 24 would also be located on the driver side of the vehicle 12 (see, for example, FIG. 1).

The structural joint 24 is established at a location of the unibody 10 where the pillar assembly 18, the cab back assembly 20, and the box rail assembly 22 each meet together. In the illustrated embodiment, the box rail assembly 22 extends in the X-axis direction of the structural joint 24, the cab back assembly 20 extends in a Y-axis direction of the structural joint 24 (e.g., to connect the pillar assembly 18 to an opposing pillar assembly of the unibody 10), and the pillar assembly 18 extends in the Z-axis direction of the structural joint 24. The pillar assembly 18, the cab back assembly 20, and the box rail assembly 22 may be directly joined (e.g., welded) together to establish the structural joint 24 of the unibody 10.

The pillar assembly 18 may include an outer pillar member 28 and an inner pillar member 30. The pillar assembly 18 may be a B-pillar or a C-pillar of the passenger cabin 14 of the unibody 10 within the scope of this disclosure. The outer pillar member 28 and the inner pillar member 30 may cooperate to establish a rear loading flange 32 and a door opening flange 34 of the pillar assembly 18. In an embodiment, the rear loading flange 32 faces rearward toward the cargo box 16 of the unibody 10, and the door opening flange 34 faces forward toward a front end of the unibody 10.

The box rail assembly 22 may include an outer box rail member 36 and an inner box rail member 38. In an embodiment, the box rail assembly 22 intersects the pillar assembly 18 and extends continuously up to the door opening flange 34 of the pillar assembly 18 (best illustrated in FIG. 4). In an embodiment, the box rail assembly 22 extends across an entire distance between the rear loading flange 32 and the door opening flange 34 of pillar assembly 18. In another embodiment, the box rail assembly 22 intersects the pillar assembly 18 at about a right angle. In this disclosure, the term "about" means that the expressed quantities or ranges need not be exact but may be approximated and/or larger or smaller, reflecting acceptable tolerances, conversion factors, measurement error, etc.

Once welded or otherwise affixed together, the box rail assembly 22 and the pillar assembly 18 establish a beam-to-beam connection of the structural joint 24. The beam-to-beam connection provides a stronger and more durable structural joint 24 compared to prior unibody constructions.

The pillar assembly 18 and the box rail assembly 22 of the structural joint 24 may be hollow or may include one or more hollow sections. One or more internal baffles 40 may therefore be disposed inside the box rail assembly 22 and/or the pillar assembly 18. The internal baffles 40 may be implemented to reduce sound transmission and to seal the hollow passages established by the pillar assembly 18 and the box rail assembly 22. In an embodiment, the internal baffles 40 are made of heat reactive, expandable, thermoplastic or elastomeric adhesive materials. However, the exact material make-up of the internal baffles is not intended to limit this disclosure.

Figure 4:
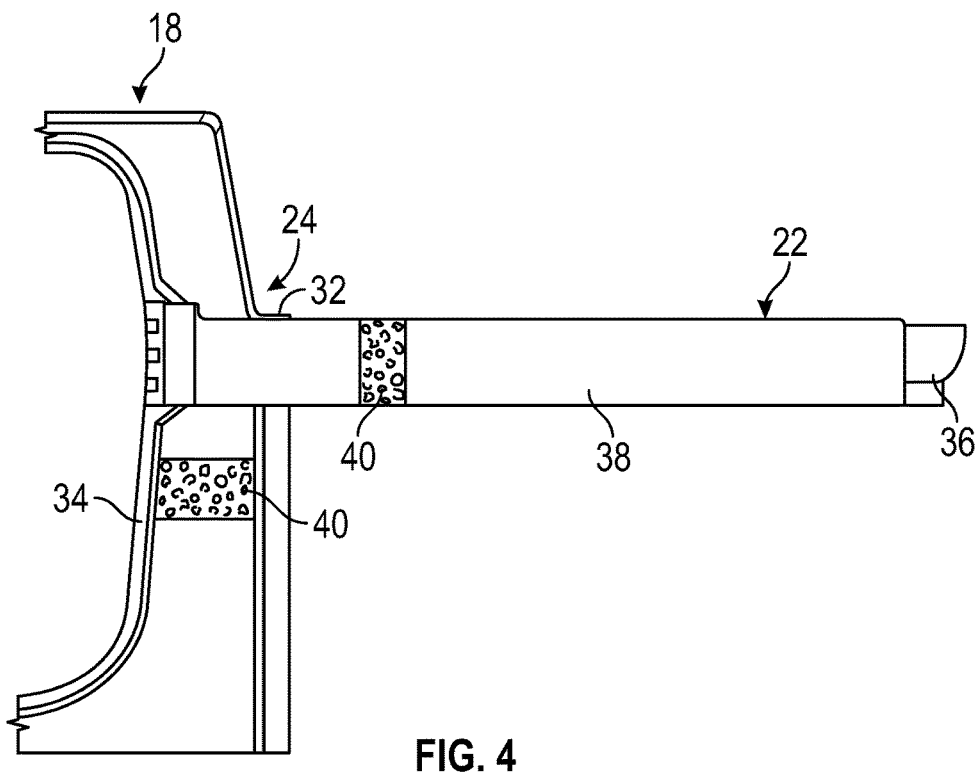
FIG. 4 illustrates a beam-to-beam intersection between a pillar assembly and a box rail assembly of the structural joint of FIGS. 2-3.

An exemplary placement of the internal baffles 40 is schematically depicted in FIG. 4. In an embodiment, one of the internal baffles 40 is disposed inside each of the pillar assembly 18 and the box rail assembly 22. However, it should be understood that other placements and configurations, which are design dependent, are further contemplated within the scope of this disclosure.

Figure 5:
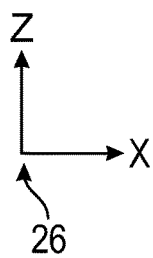
FIG. 5 is an outer side view of the structural joint of FIGS. 2-3.
Figure 5:
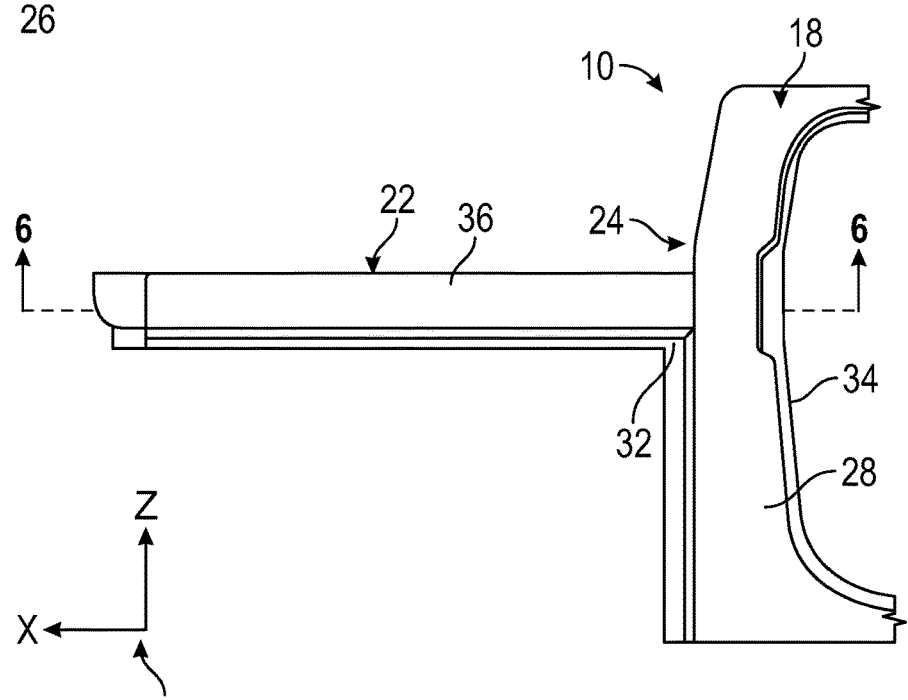
Figure 6:
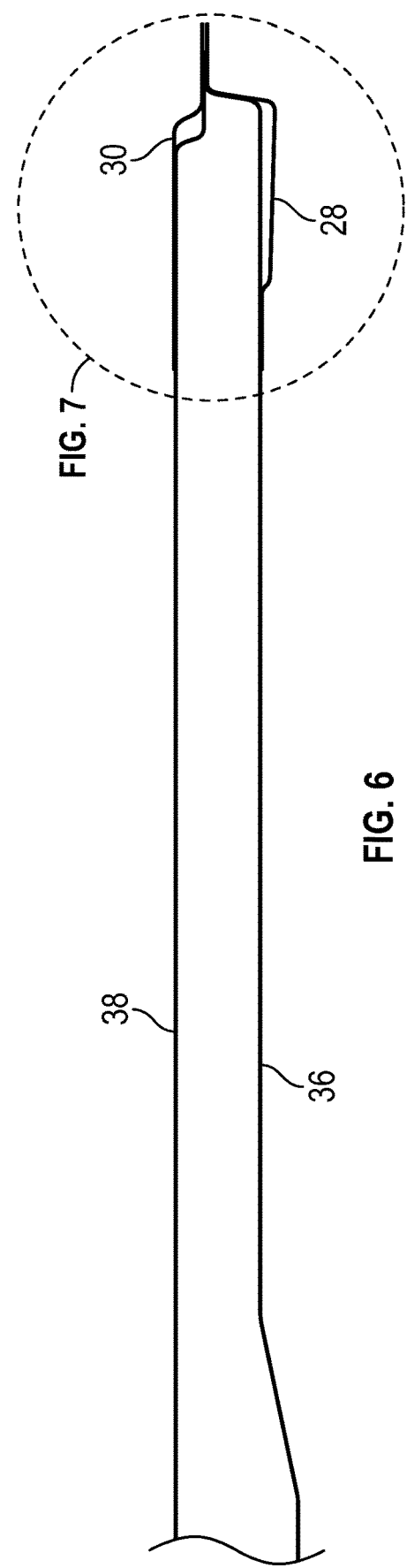
FIG. 6 is a cross-sectional view through section 6-6 of FIG. 5.
Figure 7:
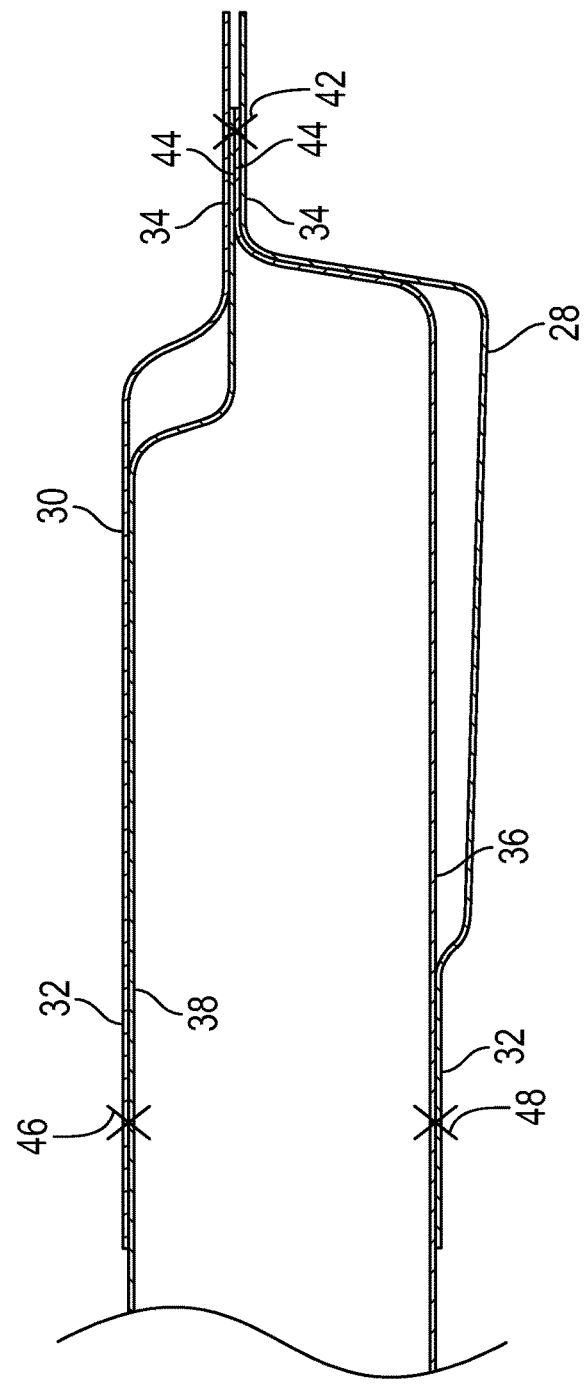
FIG. 7 is a blown-up view of select portions of the structural joint shown in FIG. 6.

Referring now primarily to FIGS. 5, 6, and 7, the box rail assembly 22 and the pillar assembly 18 may be joined together by a plurality of spot welds, which are shown schematically with an "X." In an embodiment, a first spot weld 42 is provided to join together each of a mating flange 44 of the inner box rail member 38, the door opening flange 34 of the inner pillar member 30, a mating flange 44 of the outer box rail member 36, and the door opening flange 34 of the outer pillar member 28. Although a single spot weld is schematically shown in FIG. 7, one or more spot welds could be utilized to join together the mating flange 44 of the inner box rail member 38, the door opening flange 34 of the inner pillar member 30, the mating flange 44 of the outer box rail member 36, and the door opening flange 34 of the outer pillar member 28.

In another embodiment, a second spot weld 46 is provided to join the inner box rail member 38 to the rear loading flange 32 of the inner pillar member 30. Although a single spot weld is schematically shown in FIG. 7, one or more spot welds could be utilized to joint the inner box rail member 38 to rear loading flange 32 of the inner pillar member 30.

In yet another embodiment, a third spot weld 48 is provided to join the outer box rail member 36 to the rear loading flange 32 of the outer pillar member 28. Although a single spot weld is schematically shown in FIG. 7, one or more spot welds could be utilized to join the outer box rail member 36 to the rear loading flange 32 of the outer pillar member 28.

Referring again primarily to FIGS. 2, 3, and 4, the cab back assembly 20 may be secured to a sub-assembly of the pillar assembly 18 and the box rail assembly 22 to construct the unitized structural joint 24. The cab back assembly 20 may include an inner cab back member 50, an outer cab back member 52, and a cab back panel 54 secured between the inner cab back member 50 and the outer cab back member 52. The cab back panel 54 may be secured to each of the inner and outer cab back members 50, 52 by providing one or more additional spot welds and/or an adhesive/sealer (not shown).

Figure 8:
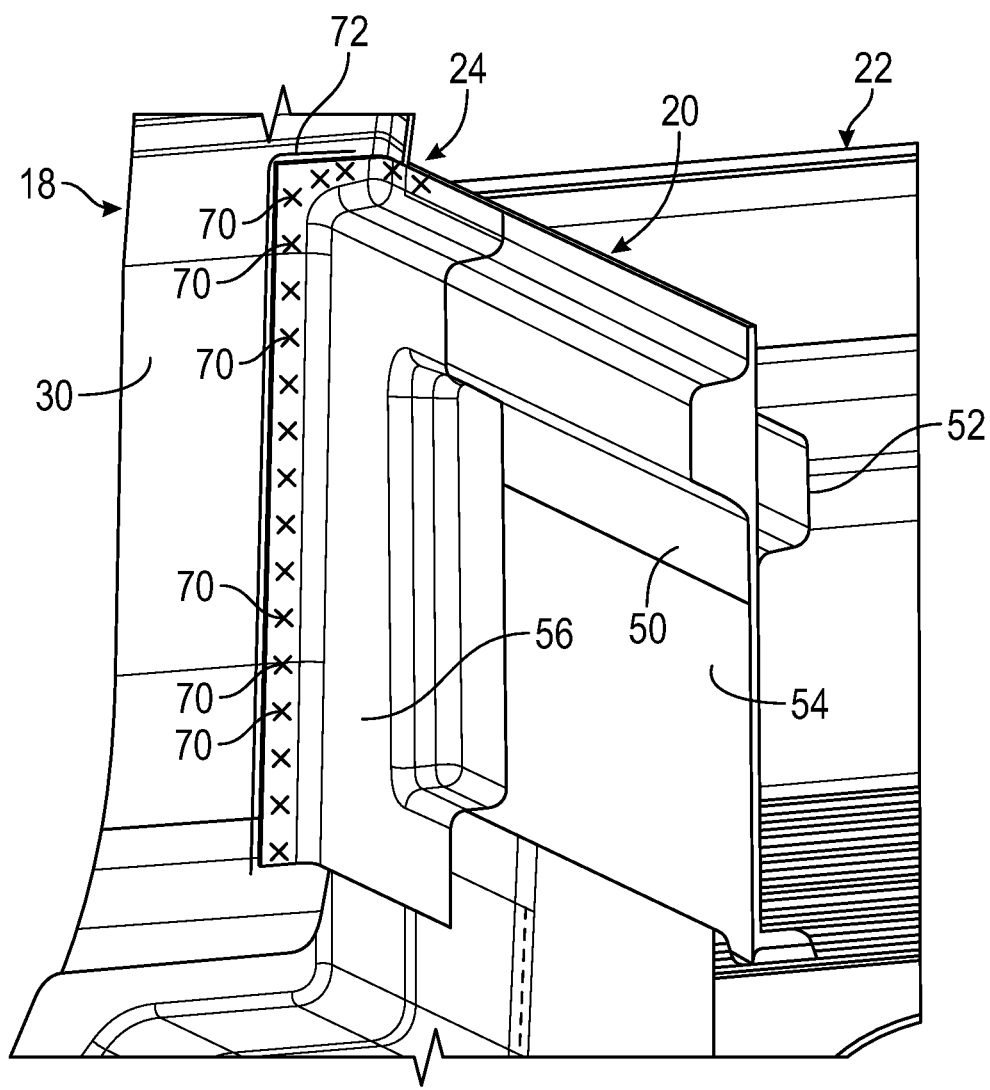
FIG. 8 illustrates an inner view of a cab back assembly of a structural joint.
Figure 9:
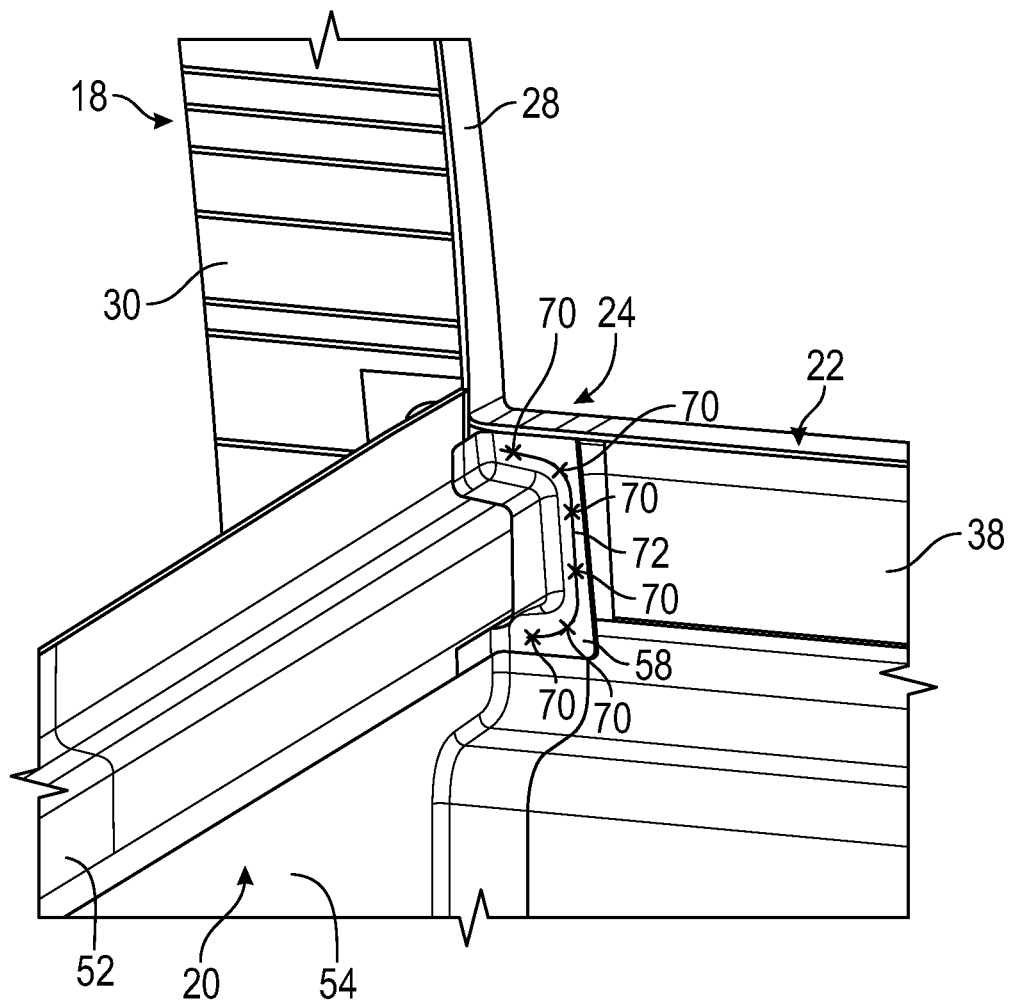
FIG. 9 illustrates an outer view of a cab back assembly of a structural joint.

The inner cab back member 50 may include a first hand-off bracket 56, and the outer cab back member 52 may include a second hand-off bracket 58. The first and second hand-off brackets 56, 58 may be utilized for securing the cab back assembly 20 to the sub-assembly of the pillar assembly 18 and the box rail assembly 22. One or more additional spot welds 70 and/or an adhesive/sealer 72 may be provided for securing the cab back assembly 20 to the sub-assembly of the pillar assembly 18 and the box rail assembly 22 (see, e.g., FIGS. 8 and 9). Once secured, the cab back assembly 20 extends along the Y-axis in a direction toward an opposite side of the vehicle 12 from the structural joint 24.

An appropriate body sealer may be applied in combination with any of the spot welds described above for joining the various components of the structural joint 24. In addition, a paint shop sealer may be applied over exposed seams of the structural joint 24 for additional leak protection.

The unibody structural joints of this disclosure establish pillar-to-box rail-to-cab back mating configurations. The proposed mating configurations provide for cost and weight optimizations within a unibody construction, thereby improving noise, vibration, and harshness (NVH) performance and durability performance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A structural joint of a unibody vehicle, comprising:
   a pillar assembly; and
   a box rail assembly that intersects the pillar assembly and extends continuously up to a door opening flange of the pillar assembly.

2. The structural joint as recited in claim 1, wherein the unibody vehicle is a unibody pickup truck.

3. The structural joint as recited in claim 1, wherein the pillar assembly includes an inner pillar member and an outer pillar member.

4. The structural joint as recited in claim 3, wherein the box rail assembly includes an inner box rail member and an outer box rail member.

5. The structural joint as recited in claim 4, comprising a first spot weld joining together a first mating flange of the inner box rail member, a first door opening flange of the inner pillar member, a second mating flange of the outer box rail member, and a second door opening flange of the outer pillar member.

6. The structural joint as recited in claim 5, comprising a second spot weld joining together the inner box rail member and a rear loading flange of the inner pillar member.

7. The structural joint as recited in claim 6, comprising a third spot weld joining together the outer box rail member and a rear loading flange of the outer pillar member.

8. The structural joint as recited in claim 1, wherein the box rail assembly intersects the pillar assembly at about a right angle.

9. The structural joint as recited in claim 1, comprising at least one internal baffle disposed inside the structural joint.

10. The structural joint as recited in claim 9, wherein the at least one internal baffle includes a first internal baffle inside the pillar assembly and a second internal baffle inside the box rail assembly.

11. The structural joint as recited in claim 1, comprising a cab back assembly secured to a sub-assembly of the pillar assembly and the box rail assembly.

12. The structural joint as recited in claim 11, wherein the cab back assembly includes an inner cab back member, an outer cab back member, and a cab back panel secured between the inner cab back member and the outer cab back member.

13. A unibody vehicle, comprising:
a pickup truck;
a pillar assembly including an inner pillar member and an outer pillar member;
a box rail assembly joined to the pillar assembly and including an inner box rail member and an outer box rail member; and
a first spot weld joining a first mating flange of the inner box rail member, a first door opening flange of the inner pillar member, a second mating flange of the outer box rail member, and a second door opening flange of the outer pillar member.

14. The unibody vehicle as recited in claim 13, comprising a second spot weld joining the inner box rail member to a rear loading flange of the inner pillar member.

15. The unibody vehicle as recited in claim 14, comprising a third spot weld joining the outer box rail member to a rear loading flange of the outer pillar member.

16. The unibody vehicle as recited in claim 13, wherein the pillar assembly and the box rail assembly establish a beam-to-beam connection of a structural joint of the unibody vehicle.

17. The unibody vehicle as recited in claim 16, comprising a first internal baffle disposed between the inner pillar member and the outer pillar member, and a second internal baffle disposed between the inner box rail member and the outer box rail member.

18. The unibody vehicle as recited in claim 13, wherein the inner box rail member extends an entire distance between a first rear loading flange and the first door opening flange of the inner pillar member, and the outer box rail member extends an entire distance between a second rear loading flange and the second door opening flange of the outer pillar member.

19. The vehicle as recited in claim 13, comprising a cab back assembly secured to a sub-assembly of the pillar assembly and the box rail assembly.

* * * * *